J. L. Joyce,
Shoe Upper,
Nº 81,378.  Patented Aug. 25, 1868.
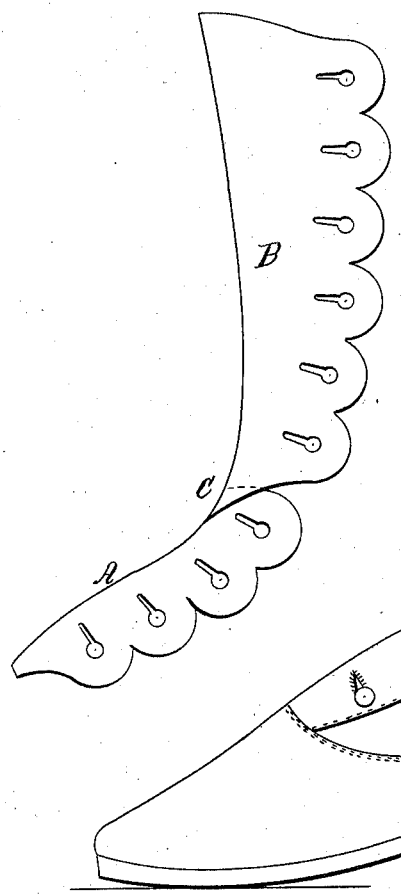
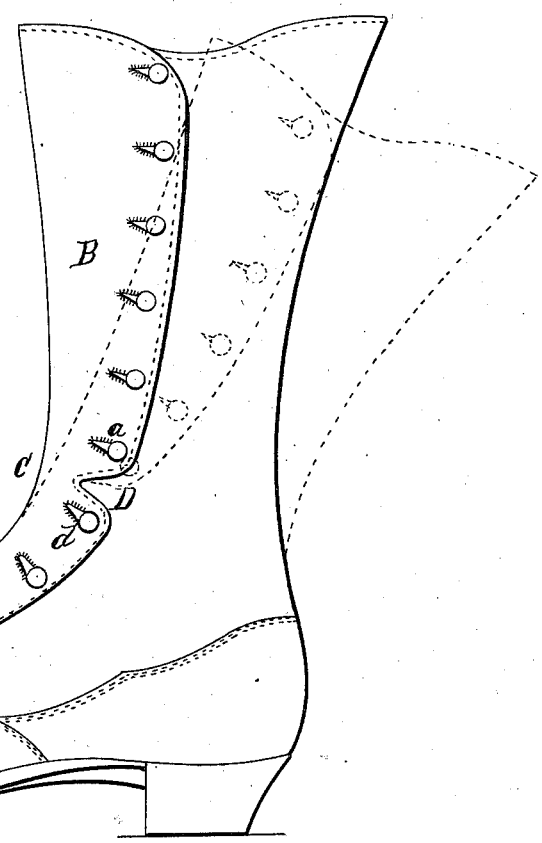
Witnesses.
Inventor
J. L. Joyce
By his Attorney:

UNITED STATES PATENT OFFICE.

JOSEPH L. JOYCE, OF NEW HAVEN, CONNECTICUT.

IMPROVEMENT IN BUTTON-BOOTS.

Specification forming part of Letters Patent No. 81,378, dated August 25, 1868.

*To all whom it may concern:*

Be it known that I, JOSEPH L. JOYCE, of New Haven, in the county of New Haven and State of Connecticut, have invented a new Improvement in Button-Boots; and I do hereby declare the following, when taken in connection with the accompanying drawings and the letters of reference marked thereon, to be a full, clear, and exact description of the same, and which said drawings constitute part of this specification, and represent, in—

Figure 1, a side view; and in Fig. 2, a side view of the fly, showing a different modification of the same improvement.

This invention relates to an improvement in that class of button-boots in which the buttons are arranged upon one side and extending over and above the ankle-joint, the object being to prevent the wrinkling at the upper instep and over the ankle; and consists in forming a joint in the fly upon the ankle-joint line, either by cutting a notch in the fly or dividing the fly entirely at that point.

In order to the clear understanding of my invention, I will fully describe the same as illustrated in the accompanying drawings.

A is the button fly or lapel below the ankle-joint line; B, the fly or lapel above the ankle-joint, C being the ankle-joint line. At the ankle-joint line—that is, on a line drawn over the ankle-joint—I form a joint, D, by cutting into the fly, as seen in Fig. 1, sufficiently far to break the fly forward of the ankle-joint.

Without this notch or cut, the bending of the ankle unavoidably wrinkles the fly at that point, or greatly strains the buttons. Thus it is that the buttons more frequently break off at the ankle-joint than at any other point on the boot; but by this notch the edge of the fly between the buttons *a* and *d* allows an expansion and contraction of the fly at that point, as denoted in Fig. 1, and thus overcomes the strain or inclination to wrinkle, and consequently renders the boot easier to the wearer and more durable, and at no perceptible increase in the cost of manufacture.

Though I prefer to cut into the fly, as described, yet the fly may be divided, as seen in Fig. 2 at C, forming the fly in two parts, and accomplish the same object.

In defining button-boots and buttons as a means of securing the fly to the boot, I wish to be understood as embracing all fastenings, and without confining myself to the particular form or design of the lapel, or manner of finishing the same, my invention being to so construct the fly as to overcome the difficulties mentioned, which is fully accomplished as herein set forth. One notch or division is all-sufficient, yet another or more may, if preferred, be added.

Having thus fully described my invention, what I claim as new and useful, and desire to secure by Letters Patent, is—

Cutting or dividing the fly at or near the ankle-joint line, substantially in the manner and for the purpose herein set forth.

JOS. L. JOYCE.

Witnesses:
J. H. SHUMWAY.
A. J. TIBBITS.